United States Patent [19]

Ishiyama

[11] 4,273,541
[45] Jun. 16, 1981

[54] CLOCK FOR EDUCATIONAL PURPOSES

[75] Inventor: Shozo Ishiyama, Tokyo, Japan

[73] Assignee: Gakken Co., Ltd., Tokyo, Japan

[21] Appl. No.: 136,523

[22] Filed: Apr. 2, 1980

[30] Foreign Application Priority Data

Apr. 6, 1979 [JP] Japan .............................. 54-45386[U]

[51] Int. Cl.³ ............................................. G09B 19/12
[52] U.S. Cl. .................................................... 434/304
[58] Field of Search ...................... 35/39; 368/45, 223, 368/224, 225; 46/39

[56] References Cited

U.S. PATENT DOCUMENTS

| | | | |
|---|---|---|---|
| 1,356,929 | 10/1920 | Lewers | 35/39 |
| 2,172,450 | 9/1939 | Pitcher | 35/39 |
| 3,002,335 | 10/1961 | Kripak | 46/39 X |
| 4,015,346 | 4/1977 | Ogasawara | 35/39 |

Primary Examiner—William H. Grieb
Attorney, Agent, or Firm—Irving M. Weiner; Pamela S. Burt; John L. Shortley

[57] ABSTRACT

A clock for educational purposes comprising a minute hand and an hour hand, both rotatably mounted at the center of the clockface, openings formed in the clockface at locations where the hours and minutes are indicated, and rotating members rotatably supported in the clock and each marked on its face with an hour indicating figure and a minute indicating figure. The surface of each rotating member is partially exposed through respective ones of the openings, and an arm is provided to rotate with the minute hand so as to individually turn the rotating members.

19 Claims, 6 Drawing Figures

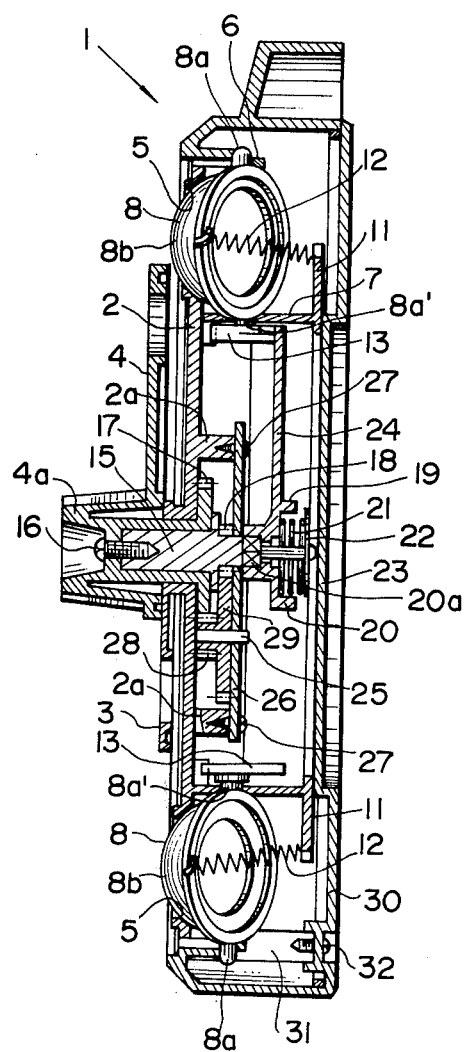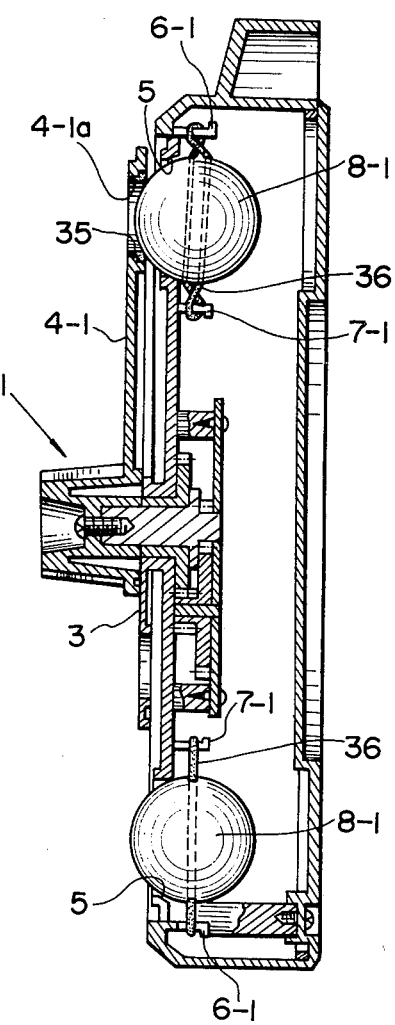
FIG. 2
FIG. 6

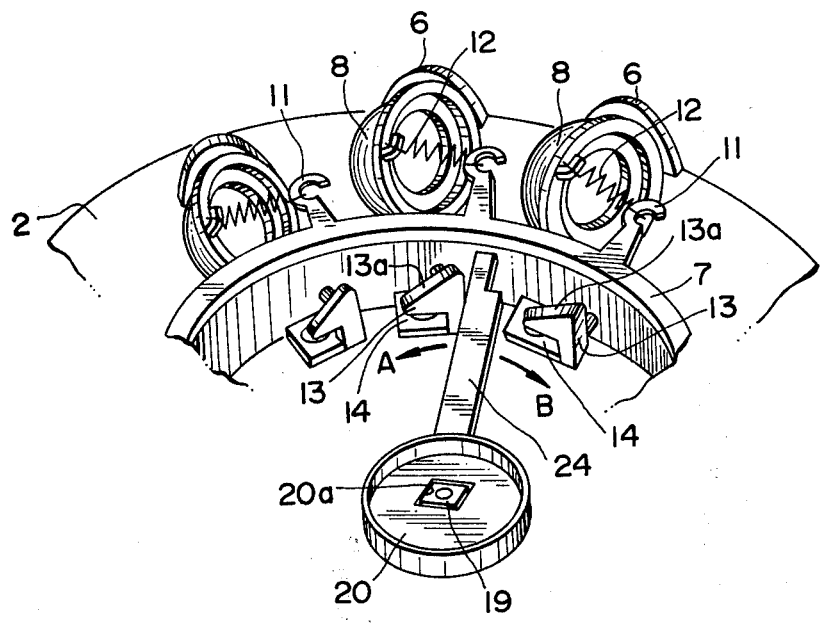
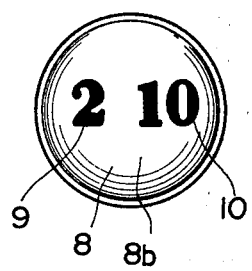
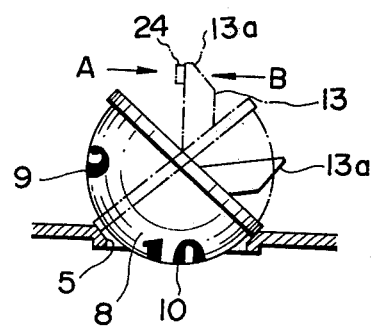

CLOCK FOR EDUCATIONAL PURPOSES

FIELD OF INVENTION

The present invention relates to a clock for educational purposes in which minute indicating figures appear to replace the normally displayed hour indicating figures as the minute hand is rotated.

In most clocks, figures or numerals (1 through 12) indicating the hours are marked along the circumference of the clockface at equal intervals with the hour hand and the minute hand indicating the hours and the minutes, respectively, of the time. Because the figures 1 through 12 represent the hours and only indirectly indicate the minutes, children in the low grades of elementary school, when reading the time with the clock of this kind, must calculate what minutes the figure pointed to by the minute hand is represented in order to read the time in hours and minutes.

The present invention overcomes the difficulties experienced in reading the time with the conventional clocks and thereby enables children to easily learn how to read the time.

SUMMARY OF THE INVENTION

The present invention relates to a clock for educational purposes which comprises: a minute hand and an hour hand, both rotatably mounted on the clockface; twelve openings formed in the clockface and arranged in a circle; and rotating members marked on their surfaces with hour indicating figures and minute indicating figures, the surfaces of the rotating members being partially exposed through the openings.

An object of the present invention is to provide a clock for educational purposes in which, as the minute hand is rotated and moves past one of the openings, the rotating member exposed through that opening is made to rotate to display the minute indicating figure instead of the normally displayed hour indicating figure, thus enabling children to easily comprehend the relationship between the hours and the minutes and learn how to read the time with clocks.

Another object of the present invention is to provide a clock for educational purposes in which the rotating members are turned either by a rotating plate which revolves with the minute hand or directly by the minute hand.

A preferred embodiment of the present invention will now be described in the following with reference to the accompanying drawings. Other objects and advantages will become apparent from the following detailed description.

BRIEF DESCRIPTION OF THE DRAWINGS

FIG. 2 is a lateral cross-sectional view of the clock of FIG. 1.

FIG. 3 is a partial perspective view of the internal construction as viewed from the back of the clock.

FIG. 4 is a plan view of the rotating member.

FIG. 5 shows the relation between the rotating member and the minute hand.

FIG. 6 is a lateral cross-sectional view, similar to FIG. 2, of another embodiment of the present invention, showing the modified minute hand and rotating members and a means for supporting the rotating member.

DETAILED DESCRIPTION OF THE INVENTION

Figure 1:
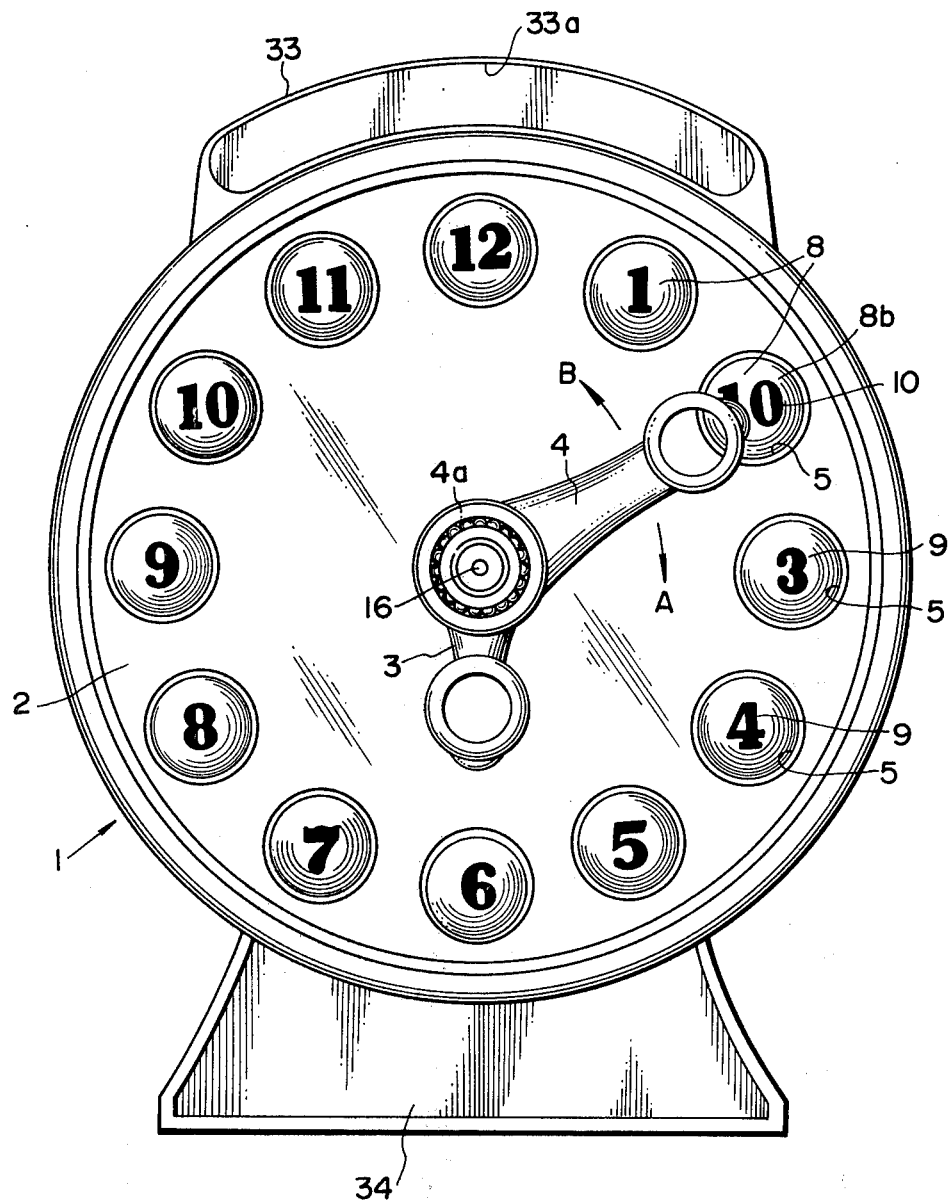
FIG. 1 is a front view of the clock for educational purposes according to the present invention.

The hour hand 3 and minute hand 4 are rotatably mounted on the clockface 2 of the clock 1 which has twelve openings 5 in a circle along the circumference thereof at equal intervals. Formed at the back of the clockface 2 along its circumference are the same number of brackets 6 (FIG. 2) as the number of openings 5. Formed on the inner side of the openings 5 is an annular bracket 7. Between the annular bracket 7 and the brackets 6, rotating members 8 are rotatably supported by shafts 8a, 8a'. All of the shafts 8a, 8a' are directed toward the center of the clock and part of the front surface 8b of each rotating member 8 is exposed through the opening 5 toward the front surface of the clockface 2. The rotating member 8 is hemispheric or cup-shaped, as shown in FIGS. 2 and 3. Marked on the front surfaces 8b of the cup-shaped rotating members 8 are, as shown in FIG. 4, twelve positive integers 9, from 1 to 12, indicating the hours of the time; and another set of integers 10 such as 5, 10, 15, etc., indicating the minutes corresponding to the hour indicating figures. In the example shown in FIG. 4, depicted the rotating member 8 has an hour indicating figure "2" and a minute indicating figure "10".

Projecting radially outwardly from the annular bracket 7, and parallel with respect to the clockface 2 are hooks 11 which are connected by coil springs 12 with the rotating members 8. Each coil spring 12 is arranged substantially perpendicular to the shafts 8a, 8a' of each respective rotating member 8, and the rotating member 8 is pulled by the coil spring 12 so that under normal conditions only the hour indicating numerals 9 are seen through the openings 5, as shown in FIG. 1.

The inner shaft 8a' of the rotating member 8 extends inwardly through the annular bracket 7 and is provided integrally with a movable member 13. As shown in FIG. 3, the movable member 13 has at its upper end a tapered surface 13a which is inclined upwardly towards the right, and one side of the lower end portion of the movable member 13 abuts against a stopper 14 secured to the back of the clockface 2. With this construction, the movable member 13 can be oscillated in the direction of the forward rotation of the minute hand 4, i.e., in the direction of the arrow A, and the oscillation in the direction of the arrow B is blocked by the stopper 14.

A shaft 15 is inserted through the center of the clockface 2 so as to be perpendicular thereto, and a knob 4a of the minute hand 4 is secured to the front portion of the shaft 15 by a set screw 16. A gear wheel 17 is rotatably mounted on the shaft 15 which is formed with teeth 18. The rear end of the shaft 15 is formed within a square pillar 19 which is received into a square hole 20a of a rotating plate 20. Disposed behind the rotating plate 20 is a spring support plate 22 which is fitted to the shaft 15 by a set screw 23, with a compressed spring 21 being interposed between the rotating plate 20 and the support plate 22. Because the square pillar 19 is inserted into the square hole 20a of the rotating plate 20, the rotating plate 20 is rotated together with the shaft 15. At the same time, the rotating plate 20 is made axially slidable on the square pillar so that under normal conditions the rotating plate 20 is urged by the spring 21 toward the clockface 2. An arm 24 projects from the base portion of the rotating plate 20 and extends in the same direction as that of the minute hand 4.

A rod 25 having a relatively small diameter is mounted substantially perpendicularly on the clockface 2 near the shaft 15. Projected from the back of the clockface 2 are two support pillars 2a to which a support plate 26 is secured by set screws 27. The end of the small diameter rod 25 is loosely inserted into, and thereby supported by, the support plate 26, which also rotatably supports the shaft 15, as shown in FIG. 2. Rotatably mounted on the rod 25 is a large diameter gear wheel 29 which also has a small diameter toothed portion 28. The small diameter toothed portion 28 meshes with the gear wheel 17 rotatably mounted on the shaft 15 while the large diameter gear wheel 29 meshes with the small diameter toothed portion 18 of the shaft 15. The hour hand 3 is linked with the minute hand 4 through the small diameter toothed portion 18, the large diameter gear wheel 29, the small diameter toothed portion 28 and the gear wheel 17 in such a manner that the ratio of rotation between the minute hand and the hour hand is 12:1. Thus, during one complete revolution of the minute hand, the hour hand will make one-twelfth of a revolution.

A bottom plate 30 is fixed by set screws 32 to a suitable number of supports 31 projecting from the back of the clockface 2. As shown in FIG. 1, integrally formed on the top of the clock 1 is a curved grip 33 with a slot 33a, through which fingers can be inserted to carry the clock. The clock 1 also has a substantially trapezoidal stand 34 formed integral therewith at the bottom.

In operation, when the minute hand 4 is rotated by revolving the knob 4a, the shaft 15 connected with the minute hand 4 by the set screw 16 is also rotated, causing the gear 29 meshing with the small diameter toothed portion 18 to rotate. The rotation of the gear 29 is transmitted to the gear wheel 17 through the small diameter toothed portion 28 to turn the hour hand 3 rigidly mounted on the gear wheel 17. Thus, the hour hand 3 rotates a required amount as the minute hand 4 revolves.

In the above process, when the minute hand 4 assumes positions other than those of the openings 5, only the hour indicating numerals are seen from all the holes 5 and the minute indicating numerals 10 are hidden from the operator's view behind the back side of the clockface 2 because the cup-shaped rotating members 8 are pulled by the spring 12 and turned to one side about the shafts 8a, 8a'. When the minute hand 4 is rotated forwardly in the direction of the arrow A and, for example, comes to the position of the opening 5, as shown in FIG. 1, which normally displays the hour-indicating figure "2" the arm 24 of the rotating plate 20 which is mounted on the shaft 15 through the engagement of the square pillar 19 with the square hole 20a revolves with the shaft 15 and also with the minute hand 4 in the direction of the arrow A, as shown in FIG. 3, with the result that the arm 24 abuts against the movable member 13 of the rotating member 8. This causes the rotating member 8 to rotate against the force of the spring 12 so that the hour indicating figure 9 ("2") disappears from the opening 5 and the figure "10" indicating the minutes of the time appears from the same opening 5. This process is illustrated in FIG. 5.

If the minute hand 4 is further rotated in the direction of the arrow A, the arm 24 disengages from the movable member 13. This causes the rotating member 8 to return to its normal position by the tension of the spring 12 with the result that the minute indicating figure 10 ("10") which has been exposed to the operator's view through the hole 5 disappears and the hour indicating figure 9 again comes to be seen from the hole 5. In this way, each rotating member 8, which under normal conditions displays the hour indicating figure 9, is rotated to display the minute indicating figure 10 and conceals the hour indicating figure 9 when the minute hand 4 which rotates the arm 24 therewith is moving past the hole 5, and then the rotating member 8 exposes again the hour indicating figure 9 through the hole 5 after the minute hand 4 has moved past the hole 5. Thus, the child or other operator can easily recognize the relationship between the hours and the minutes by seeing the hour indicating figures 9 and the minute indicating figures 10, which appear alternately as the operator rotates the minute hand 4 forwardly in the direction of the arrow A.

When it is attempted to rotate the minute hand 4 backwardly in the direction of the arrow B, as shown in FIG. 1, the rotating member 8 is prevented from being turned because the reverse rotation of the minute hand is unnatural in the action of the clock. Such feature will be explained in the following with reference to FIG. 3.

When the minute hand 4 is rotated reversely, turning the arm 24 with it in the direction of the arrow B, the arm 24 abuts against the movable member 13 and reaches the tapered surface 13a of the member 13. At this time, the oscillatory movement of the member 13 is blocked by the stopper 14 so that the rotating member 8 does not rotate and the two kinds of figures 9, 10 do not alternate. As already described, the rotating plate 20 with the arm 24 is made to rotate with the shaft 15 by the engagement of the square pillar 19 with the square hole 20a. However, because the rotating plate 20 is axially slidable on the shaft 15, the arm 24 is guided along the tapered surface 13a, compressing the spring 21, and moves over the movable member 13, which is restricted against oscillatory movement.

While in the above embodiment the rotating member 8 is made to rotate by the arm 24 of the rotating plate 20 which is turned along with the minute hand 4, it is also possible to extend the free end of the minute hand 4 to the opening 5 and turn the rotating member 8 at the opening 5 by the extended minute hand 4. FIG. 6 shows the minute hand 4-1 extended beyond the opening 5. The clock in this embodiment obviates the rotating plate 20 which rotates with the minute hand 4, the spring 21 resiliently supporting the rotating plate 20 and the movable member secured to the shaft 8a' of the rotating member 8, and is therefore simplified in construction. In this embodiment, where the rotating member 8 is rotated directly by the minute hand 4-1, the free end of the minute hand 4-1 is formed with a hole 4-1a at a point corresponding to the opening 5, and a friction member 35 made of material such as sponge is fitted to the inner circumferential surface of the hole 4-1a so as to cause the rotating member to rotate by the friction between the two members.

Furthermore, a hollow global rotating member 8-1 may be used instead of the cup-shaped rotating member 8, as shown in FIG. 6. In this case, a resilient member 36 made of material such as rubber is inserted through the rotating member 8-1 and is fitted at the ends thereof to the L-shaped brackets 6-1, 7-1 to support the global rotating member 8-1 in a suspended condition. In this way, the resilient member 36 can perform the function of the shafts 8a, 8a' of the cup-shaped rotating member 8 as well as the function of the coil spring 12 which maintains the rotating member 8 in its normal position by virtue of the tension thereof. More specifically, the global rotating member 8-1 is turned by the frictional engagement with the minute hand 4-1 twisting the resilient member 36; and when released from the frictional engagement, returns to its normal position by the restoring force of the resilient member 36, thus performing the actions similar to those of the cup-shaped rotating member 8.

It is possible to use as the resilient member 36 two parallel threadlike members with no elasticity or a member formed of a single strip of resilient material inserted through the global rotating member 8-1. In other words, any suitable member may be used as the member 36 if, when twisted by the rotation of the global rotating member 8-1, it produces a restoring force tending to return the rotating member 8-1 to its normal position. It is also apparent that the fitting of the resilient member 36 to the global rotating member 8 is not restricted to the above descriptions, and the member 36 may be fused or bonded to the rotating member 8-1.

I claim:

1. A clock for educational purposes, comprising:
   a minute hand and an hour hand, both rotatably mounted at the center of the clockface;
   twelve openings formed in the clockface at locations where the hours and minutes are indicated;
   a rotating member provided for each said opening and each marked on its surface with an hour indicating figure and a minute indicating figure, the surface of each rotating member being partially exposed through respective ones of said openings;
   movable members each secured to a shaft of said rotating member; and
   an arm adapted to rotate with said minute hand to oscillate respective ones of said movable members as said minute hand is turned.

2. A clock for educational purposes according to claim 1, wherein a grip is integrally formed on the upper portion of the clock.

3. A clock for educational purposes according to claim 1, wherein a trapezoidal stand is integrally formed on the lower portion of the clock.

4. A clock for educational purposes according to claim 1, wherein said rotating members are rotatably supported between an annular bracket and a plurality of brackets, both projecting rearwardly from the back of the clockface and facing each other with said openings therebetween.

5. A clock for educational purposes according to claim 1, wherein:
   said arm is rigidly connected to said minute hand through the engagement of a square pillar of a rotating shaft of said minute hand with a square hole formed in a rotating plate at the base of said arm.

6. A clock for educational purposes according to claim 5, wherein:
   said arm is resiliently engaged with said rotating shaft of said minute hand by a coil spring.

7. A clock for educational purposes according to claim 4, wherein all the shafts of said rotating members are directed toward the center of the clock.

8. A clock for educational purposes according to claim 4, wherein:
   hooks are projected radially outwardly from said annular bracket and are substantially parallel to the clockface, and tensed coil springs are interposed between said hooks and said rotating members.

9. A clock for educational purposes according to claim 8, wherein:
   said coil springs are disposed substantially perpendicular to said shaft of said rotating member.

10. A clock for educational purposes according to claim 1, wherein:
    said movable members are secured at substantially the central portions thereof to said shafts of said rotating members.

11. A clock for educational purposes according to claim 10, wherein:
    said movable members have upper surfaces formed into tapered surfaces which are upwardly inclined in the rightward direction of said clock.

12. A clock for educational purposes according to claim 10, wherein:
    said movable members bear at one side of the lower ends thereof against stoppers.

13. A clock for educational purposes according to claim 1, wherein:
    said minute hand is elongated to such an extent that the free end of the minute hand extends beyond said openings.

14. A clock for educational purposes according to claim 13, wherein:
    the free end of said minute hand is formed with a hole at a location corresponding to said openings, and a friction member is disposed on the inner circular surface of said hole.

15. A clock for educational purposes according to claim 1, wherein said rotating members have a global forms 16. A clock for educational purposes according to claim 15, wherein each said rotating member is suspended by a resilient member.

17. A clock for educational purposes according to claim 16, wherein said resilient member comprises a rubber member.

18. A clock for educational purposes according to claim 17, wherein said rubber member is formed of a single strip of rubber.

19. A clock for educational purposes according to claim 16, wherein the resilient member is two thread members.

* * * * *